United States Patent [19]

Schopfer

[11] Patent Number: 5,273,334
[45] Date of Patent: Dec. 28, 1993

[54] GARMENT CARRIER

[76] Inventor: E. Kevin Schopfer, 474 Glen Rd., Weston, Mass. 02193

[21] Appl. No.: 878,630

[22] Filed: May 5, 1992

[51] Int. Cl.⁵ .............................................. B65D 71/40
[52] U.S. Cl. .................................... 294/137; 294/165; 294/167
[58] Field of Search ............... 294/137, 145, 149, 151, 294/153, 156, 158, 165, 167, 169, 87.2; 206/300

[56]  References Cited
U.S. PATENT DOCUMENTS

| | | | |
|---|---|---|---|
| 2,248,234 | 7/1941 | Hickman et al. | 294/137 X |
| 2,696,401 | 12/1954 | Church et al. | 294/87.2 |
| 2,711,922 | 6/1955 | Batkin | 294/87.2 |
| 2,769,587 | 11/1956 | Threeton | 224/45 |
| 3,104,788 | 9/1963 | Wood | 294/165 X |
| 3,495,760 | 2/1970 | Poth | 294/137 |
| 3,606,967 | 9/1971 | Roberts | 224/45 |
| 3,633,802 | 1/1972 | Webster | 224/45 |
| 3,692,218 | 9/1972 | Friedman | 224/45 |
| 3,885,723 | 5/1975 | Magnie | 224/45 |
| 4,030,649 | 6/1977 | Potoroka | 294/149 |
| 4,060,169 | 11/1977 | Hildebrand et al. | 206/300 X |
| 4,112,541 | 9/1978 | Tetradis | 294/137 X |
| 4,288,012 | 9/1981 | Doak | 294/143 |
| 4,296,959 | 10/1981 | Helbig | 294/143 |
| 4,335,839 | 6/1982 | Kessler et al. | 294/142 |
| 4,474,316 | 10/1984 | Philibert | 223/88 |
| 4,557,516 | 12/1985 | Usner | 294/143 |
| 4,558,896 | 12/1985 | Farnworth | 294/167 X |
| 4,895,295 | 1/1990 | Montgomery et al. | 294/156 X |

Primary Examiner—David M. Mitchell
Assistant Examiner—Dean J. Kramer
Attorney, Agent, or Firm—Fish & Richardson

[57]  ABSTRACT

A garment carrier, and a blank for forming a garment carrier, may be used once or a few times for transport of one or a few garments on hanger hooks, and then discarded. The carrier has a body of thin material, e.g. corrugated cardboard or biodegradable, or other plastic, forming a handle and defining an orifice for receiving the free end of one or a few hangers. A hinged flap extends at least across the body and may be secured thereto, and a securement tab connected to the flap extends through another orifice in the body to define a limited securement region containing the hangers. In preferred embodiments, another flap connected to the first extends about the body and also serves to restrict movement of the free end of the tab extending through the orifice.

21 Claims, 6 Drawing Sheets

GARMENT CARRIER

BACKGROUND OF THE INVENTION

The invention relates to a device for carrying one or a few garments on hangers, and in particular to such a device which may be used once or a few times.

When transporting one or a few garment, e.g. after purchase or dry cleaning, the garments are usually on hooked hangers. The hooks, which may be of different shapes and types, can create a hazard and/or an annoyance as they become engaged on clothing and anything else that passes within range. The collection of hooks is often bulky, and it is often a chore or even painful to carry one or more garments for any distance or period of time. It is also difficult to engage the hooks as a unit, e.g. on the garment hook in an automobile or over clothes racks or the like. Finally, if the hooks are not secured together, in a manner be handled as a unit, the unengaged hanger, and the clothing placed upon it, may be dropped, or even lost.

Others have thought to provide a case for garment hooks to assist travelers using a garment or suit bag. For example, Threeton U.S. Pat. No. 2,769,587 describes a tubular case which opens along a central vertical axis and provides a ring for receiving the ends of the hangers. Magnie U.S. Pat. No. 3,885,723 describes a carrier device which is flexed to permit a hanger hook to be inserted into an elongated cavity. Doak U.S. Pat. No. 4,288,012 describes a handle which defines a magazine for receiving garment hanger hooks to be secured by a removable retainer pin.

SUMMARY OF THE INVENTION

According to one aspect of the invention, a garment carrier formed of a thin piece of material/comprises a body having an upper portion defining a first orifice extending therethrough, the upper portion forming a handle, and a lower portion having a first vertical edge and defining a second orifice for receiving a free end of one or more garment hanger hooks therethrough and a third orifice, a first flap having a first vertical edge and a second vertical edge generally parallel thereto, the lower portion and the first flap joined in a hinged connection along respective first vertical edges, a second flap having a second vertical edge, the first flap and the second flap joined along respective second vertical edges, a securement tab having a first end connected to an inner face surface of the second flap and a second free end, the second flap adapted for movement from a first position with the inner face surface spaced from face surfaces of the lower portion and a second position with the inner face surface disposed in opposition to, and generally in registration with, an inner face surface of the lower portion, the securement tab, with the second flap in the second position, disposed to extend through the third orifice, thus to define a garment hanger hook securement region adjacent an inner face surface of the first flap opposed to a region between respective inner face surfaces of the lower portion and of the second flap, the garment carrier further comprising means for securing the second flap in the second position for transport and storage of garments.

Preferred embodiments of this aspect of the invention may include one or more of the following features. The first flap and the second flap are joined along respective second vertical edges in hinged connection. The second flap has a third vertical edge generally parallel to the second vertical edge, and the garment carrier further comprises a third flap having a third vertical edge and a fourth vertical edge generally parallel thereto, the second flap and the third flap joined in a hinged connection along respective third vertical edges, and a fourth flap having an inner face surface and a fourth vertical edge, the third flap and the fourth flap joined along respective fourth vertical edges, the fourth flap adapted for movement from a first position with its inner face surface spaced from face surfaces of the lower portion and a second position with its inner face surface disposed in opposition to an opposed outer face surface of the lower portion, the outer face surface being opposite to the inner face surface of the lower portion disposed in opposition to the inner face surface of the second flap, and the means for securing the second flap in the second position for transport and storage of garments comprises an adhesive member disposed between opposed surfaces of the lower portion and the fourth flap. Preferably, the third flap and the fourth flap are joined along respective fourth vertical edges in hinged connection. In the second position, the free end of the securement tab is disposed between the opposed surfaces of the lower portion and the fourth flap. Preferably, the inner face surface of the fourth flap is disposed generally in registration with the opposed face surface of the lower portion. The upper portion defines a fourth orifice sized and adapted for receiving an automobile garment hook therethrough for suspension of the garment carrier. The first orifice has a first upper, generally horizontal edge and the garment carrier further comprises a fifth flap having a surface and a first horizontal edge, the upper portion and the fifth flap joined in a hinged connection along respective first horizontal edges, whereby the fifth flap defines a carrying surface for distributing load during transport of garments. Preferably, the fifth flap has a second horizontal edge generally parallel to the first horizontal edge, and the garment carrier further comprises a sixth flap having a surface and a second horizontal edge, the fifth flap and the sixth flap joined in a hinged connection along respective second horizontal edges, whereby the fifth and sixth flaps together define the carrying surface for distributing load during transport of garments. More preferably, the carrying surface is formed by a surface of the upper portion, dislodged from the first orifice. The second flap defines a second flap orifice having a vertical securement edge, and the first end of the securement tab is attached to the second flap in hinged connection at the vertical securement edge. Preferably, the securement tab is formed of material dislodged from the second flap orifice. The thin piece of material is formed of a biodegradable material, e.g. cardboard, or plastic.

According to the another aspect of the invention, a blank of corrugated cardboard and the like for forming a garment carrier/comprises a body having an upper portion defining a first orifice extending therethrough, and a lower portion having a first vertical edge and defining a second orifice and a third orifice, a first flap having a first vertical edge and a second vertical edge generally parallel thereto, the lower portion and the first flap joined in a hinged connection along respective first vertical edges, a second flap having a second vertical edge, the first flap and the second flap joined along respective second vertical edges, and the second flap defining a second flap orifice having a vertical securement edge, and a securement tab formed by dislodgement of material from the second flap orifice, the securement tab having a first end attached to the second flap at the vertical securement edge and a second free end.

Preferred embodiments of this aspect of the invention may include one or more of the following features. The first flap and the second flap are joined along respective second vertical edges in hinged connection. The second flap has a third vertical edge generally parallel to the second vertical edge, and the blank further comprises a third flap having a third vertical edge and a fourth vertical edge generally parallel thereto, the second flap and the third flap joined in a hinged connection along respective third vertical edges, and a fourth flap having an inner face surface and a fourth vertical edge, the third flap and the fourth flap joined along respective fourth vertical edges. Preferably, the third flap and the fourth flap are joined along respective fourth vertical edges in hinged connection. The upper portion defines a fourth orifice. The first orifice has a first upper, generally horizontal edge and the blank further comprises a fifth flap having a surface and a first horizontal edge, the upper portion and the fifth flap joined in a hinged connection along respective first horizontal edges. Preferably, the fifth flap has a second horizontal edge generally parallel to the first horizontal edge, and the blank further comprises a sixth flap having a surface and a second horizontal edge, the fifth flap and the sixth flap joined in a hinged connection along respective second horizontal edges. The thin piece of material is formed of a biodegradable material.

The objectives of the invention including providing a device for carrying one or few garments on hangers, that is low in cost for both material and labor, and that may be discarded after one or a few uses.

Other features and advantages will be seen from the following description of a presently preferred embodiment, and from the claims.

DESCRIPTION OF THE PREFERRED EMBODIMENT(S)

Figure 1:
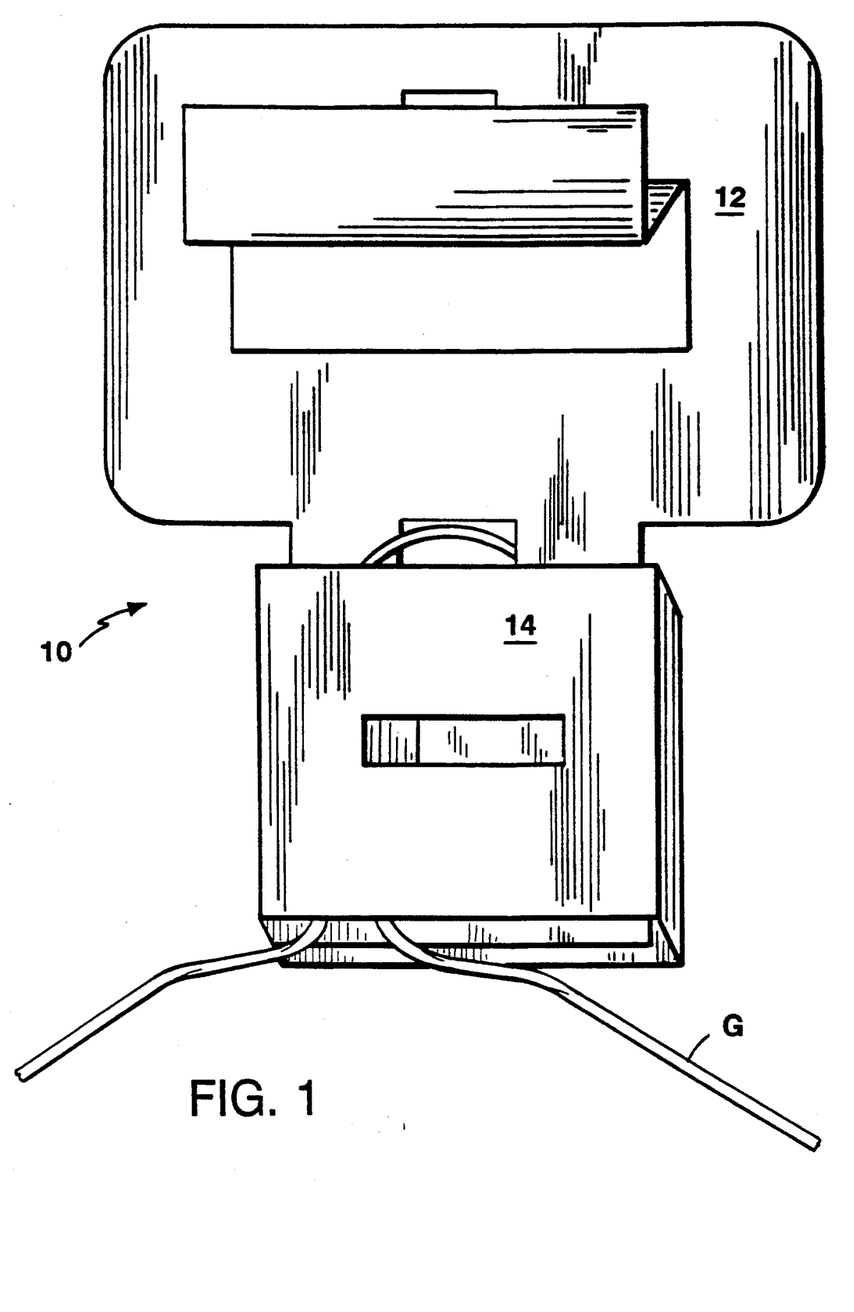
FIG. 1 is a perspective view of a garment carrier of the invention.

Referring to FIG. 1, a garment carrier 10 of the invention has a handle 12, and a lower segment 14 for receiving and retaining one or a few hanger hooks, G, for transport and storage of garments.

Figure 2:
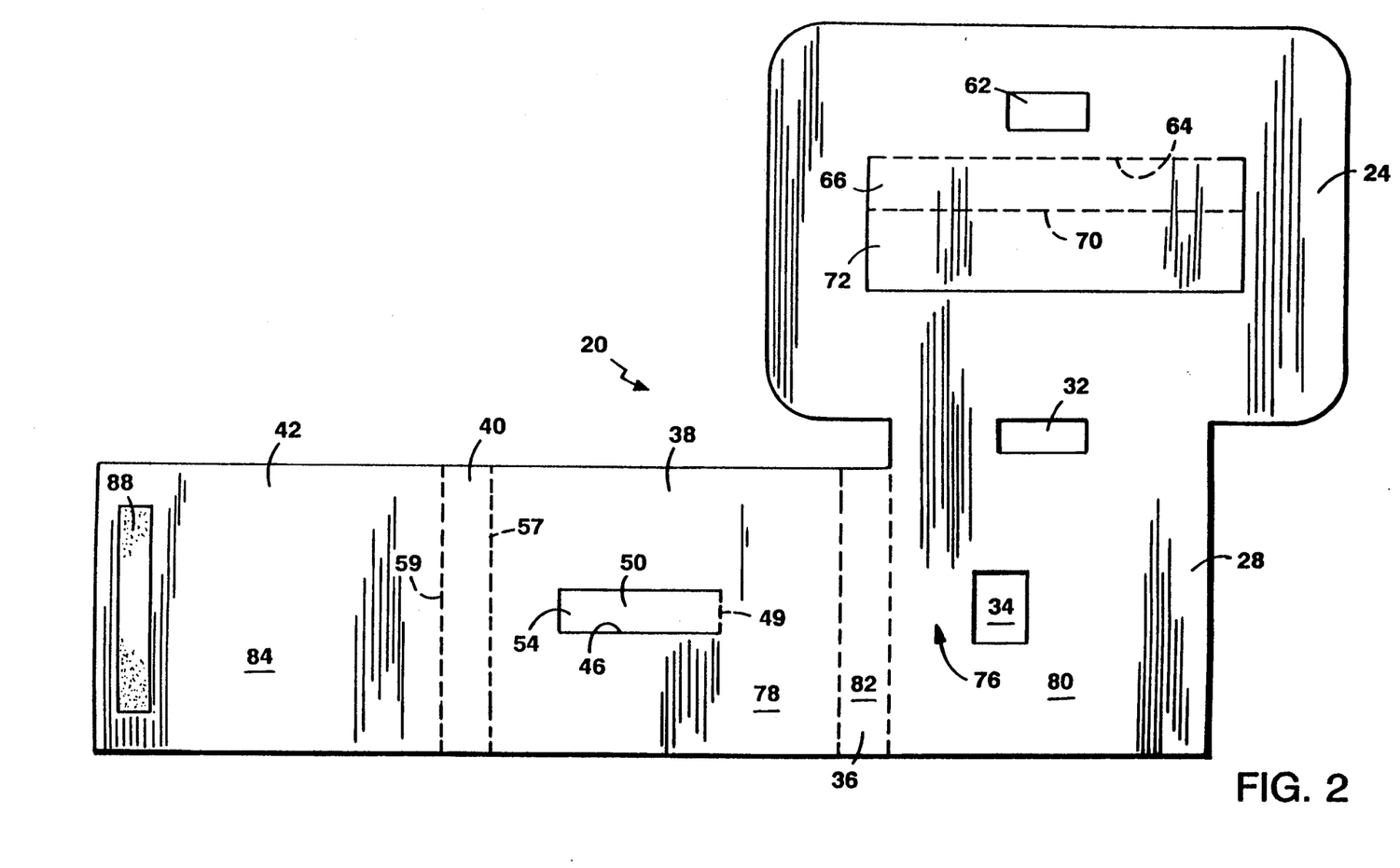
FIG. 2 is a front plan view of a blank for forming the garment carrier of FIG. 1.
Figure 3:
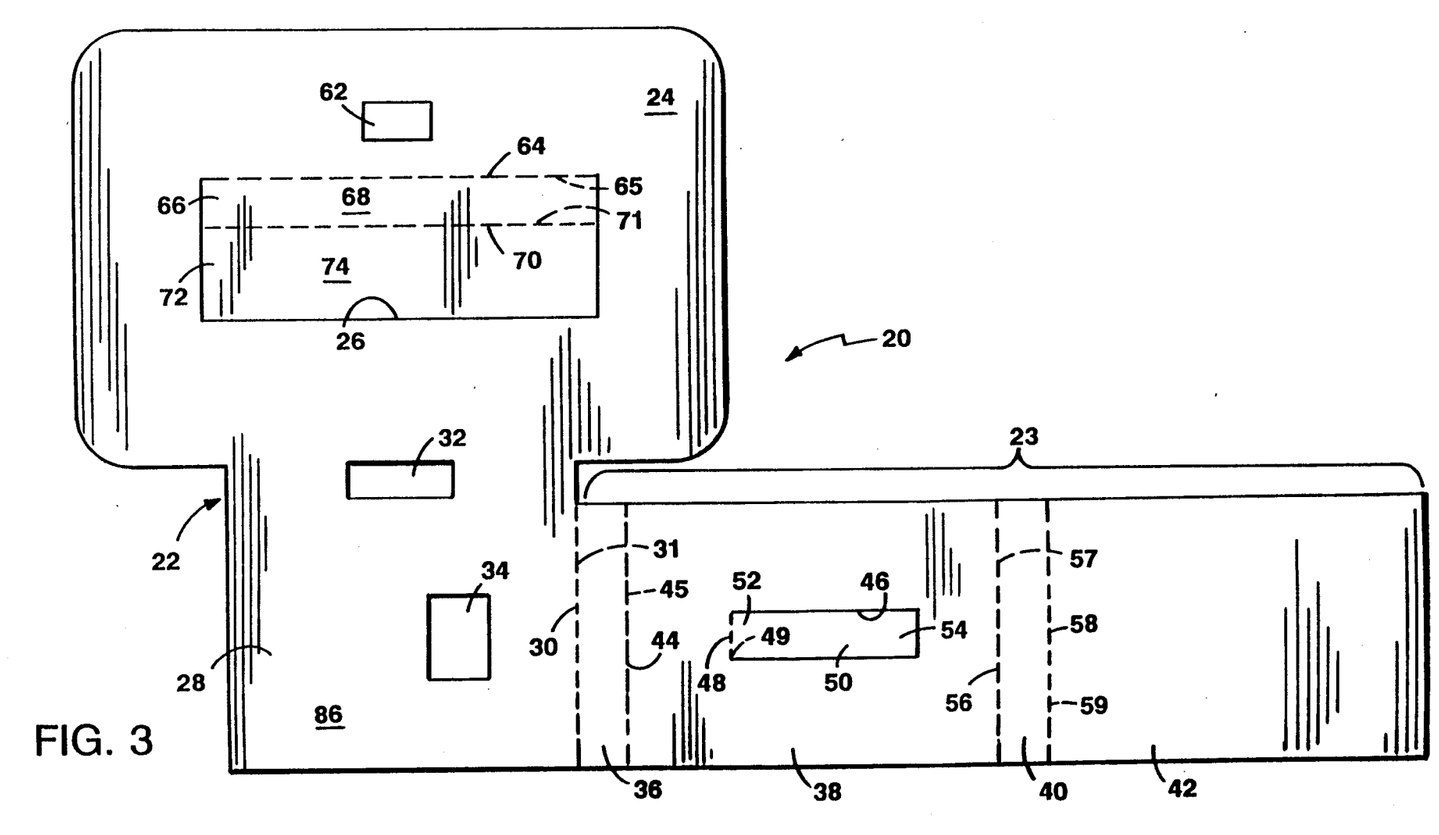
FIG. 3 is a rear plan view of a blank for forming the garment carrier of FIG. 1.

Referring now to FIGS. 2 and 3, the garment carrier 10 is formed from a blank 20 of a thin piece of suitable material such as plastic or a biodegradable material such as corrugated cardboard or plastic.

The blank 20 has a body 22 having an upper portion 24 defining a first orifice 26 extending therethrough, and a lower portion 28 having a first vertical edge 30 and defining a second orifice 32 and a third orifice 34. In the preferred embodiment, the body 22 of the blank 20 has a leg 23 consisting of a first flap 36, a second flap 38, a third flap 40 and a fourth flap 42 hingedly connected in sequence from the first vertical edge, at first fold-line 31.

By way of example only in the preferred embodiment shown, the body 22 is about 7⅞ inches high, with the upper portion 24 about 6¼ inches wide and the lower portion 28 about 3½ inches wide. The first orifice 26 is about 4 inches wide by about 1⅞ inches high. The second orifice 32 is about ⅝ inch wide by about ⅝ inch high and the third orifice 34 is about ⅝ inch wide by about ⅝ inch high. The flaps 36, 38, 40 and 42 are each about 2⅝ inches high. The first and third flaps 36, 40 are each about ½ inch wide. The second and fourth flaps 38, 42 are each about 3¼ inches wide.

The first flap 36 has first vertical edge 30 and a second vertical edge 44 generally parallel thereto, the lower portion 28 and the first flap 36 joined in a hinged connection along the first vertical edge, at first fold-line 31. The second flap 38 also has second vertical edge 44, with the first flap 36 and the second flap 38 joined along the second vertical edge, preferably in a hinged connection, at second fold-line 45. The second flap 38 also defines a second flap orifice 46 having a vertical securement edge 48. A securement tab 50, formed by dislodgement of material from the second flap orifice 46, has a first end 52 attached to the second flap at the vertical securement edge, in hinged connection, at tab fold-line 49, and a second free end 54. By way of example, the second flap orifice 46 is about 1⅞ inches wide by about ⅝ inch high. The securement tab 50 has similar dimensions.

The second flap 38 also has a third vertical edge 56 generally parallel to the second vertical edge 44, and the third flap 40 has the third vertical edge and a fourth vertical edge 58 generally parallel thereto. The second flap 38 and the third flap 40 are joined in a hinged connection along the third vertical edge 56 at third fold-line 57.

The fourth flap 42 has an inner face surface 60 and the fourth vertical edge 58, where the third and fourth flaps are joined, in a hinged connection, at fourth fold-line.

The upper portion 24 of the blank 20 defines a fourth orifice 62 which in the preferred embodiment is about ⅞ inch wide about ⅞ inch high.

The first orifice 26 has a first, upper, generally horizontal edge 6 and blank 20 further comprises a fifth flap 66 having a 68, the upper portion 24 and the fifth flap 66 being joined in a hinged connection along the first horizontal edge 64, at fifth fold-line 65. Preferably, the fifth flap has a second horizontal edge 70 generally parallel to the first horizontal edge, and the blank 20 further comprises a sixth flap 72 having a surface 74, the fifth flap 66 and the sixth flap 72 being joined in a hinged connection along this second horizontal edge 70, at sixth fold-line 71. By way of example, the fifth flap 66 is about 4 inches wide by about ⅞ inch high while the sixth flap 72 is also about 4 inches wide and about 1 inch high, the flap being formed by dislodgement of the material from the first orifice 26.

Referring now also to FIGS. 1 and 4-6, to form the garment hanger 10 of the invention from the blank 20, the material is full removed from the second, third and fourth orifices 32, 34, 62. The material in the first orifice 26 is dislodged to form a handle opening and folded at fold-lines lines 65, 71, thus to place surfaces 68, 74 is position to distribute the weight of the carrier and garment away from the first horizontal edge 70 for improved comfort for the user. The material in the second flap orifice 46 is dislodged and folded at fold-line 49 to form the securement tab 50. The blank 20 is next folded at fold-lines 31, 45, and 59 to form first flap 36, second flap 38, third flap 40 and fourth flap 42 extending in sequence from lower portion 28 at first vertical edge 30.

Figure 4:
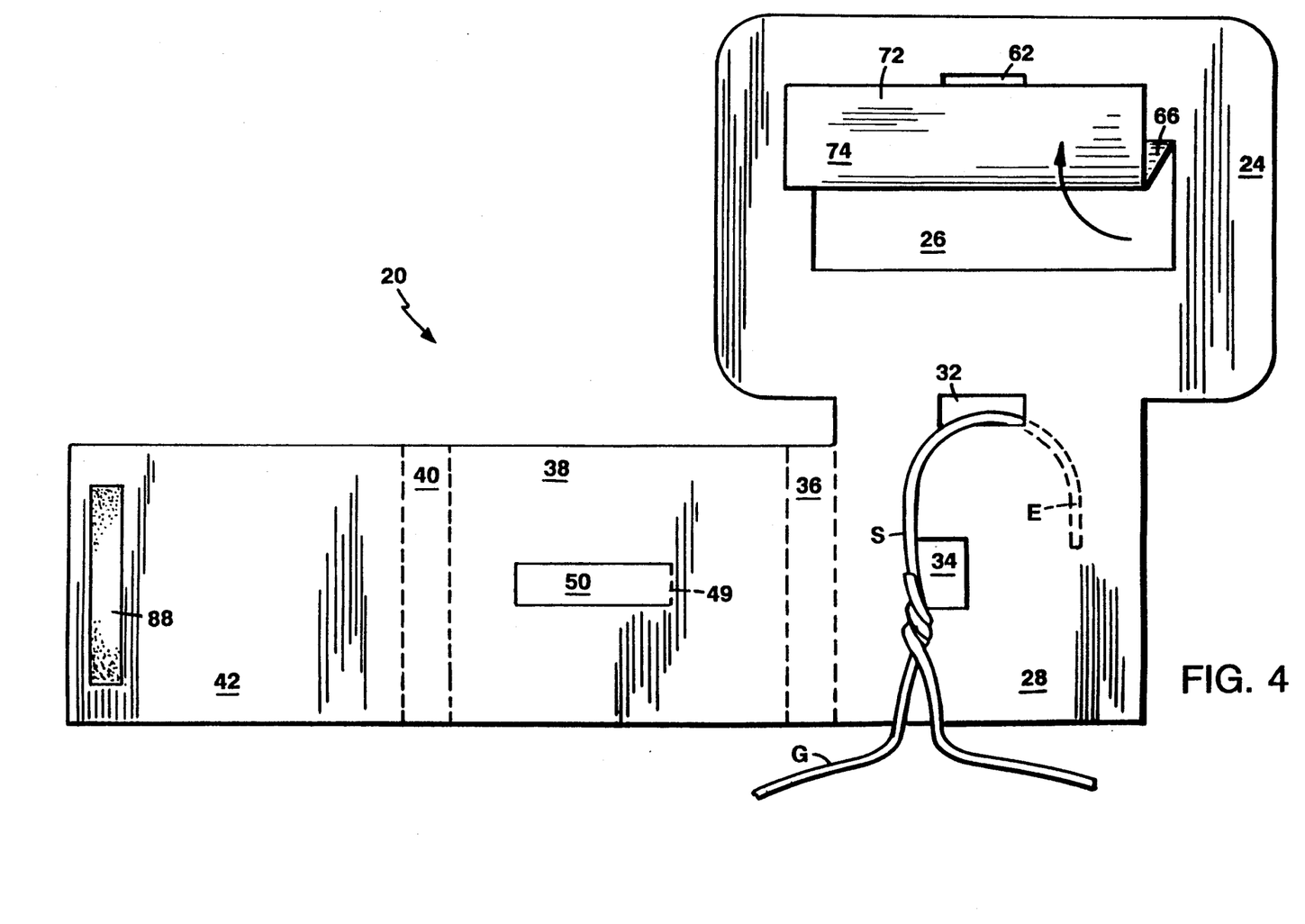
FIGS. 4, 5 and 6 are somewhat diagrammatic sequential views showing formation of the blank of FIGS. 2 and 3 into a garment carrier of the invention.
Figure 5:
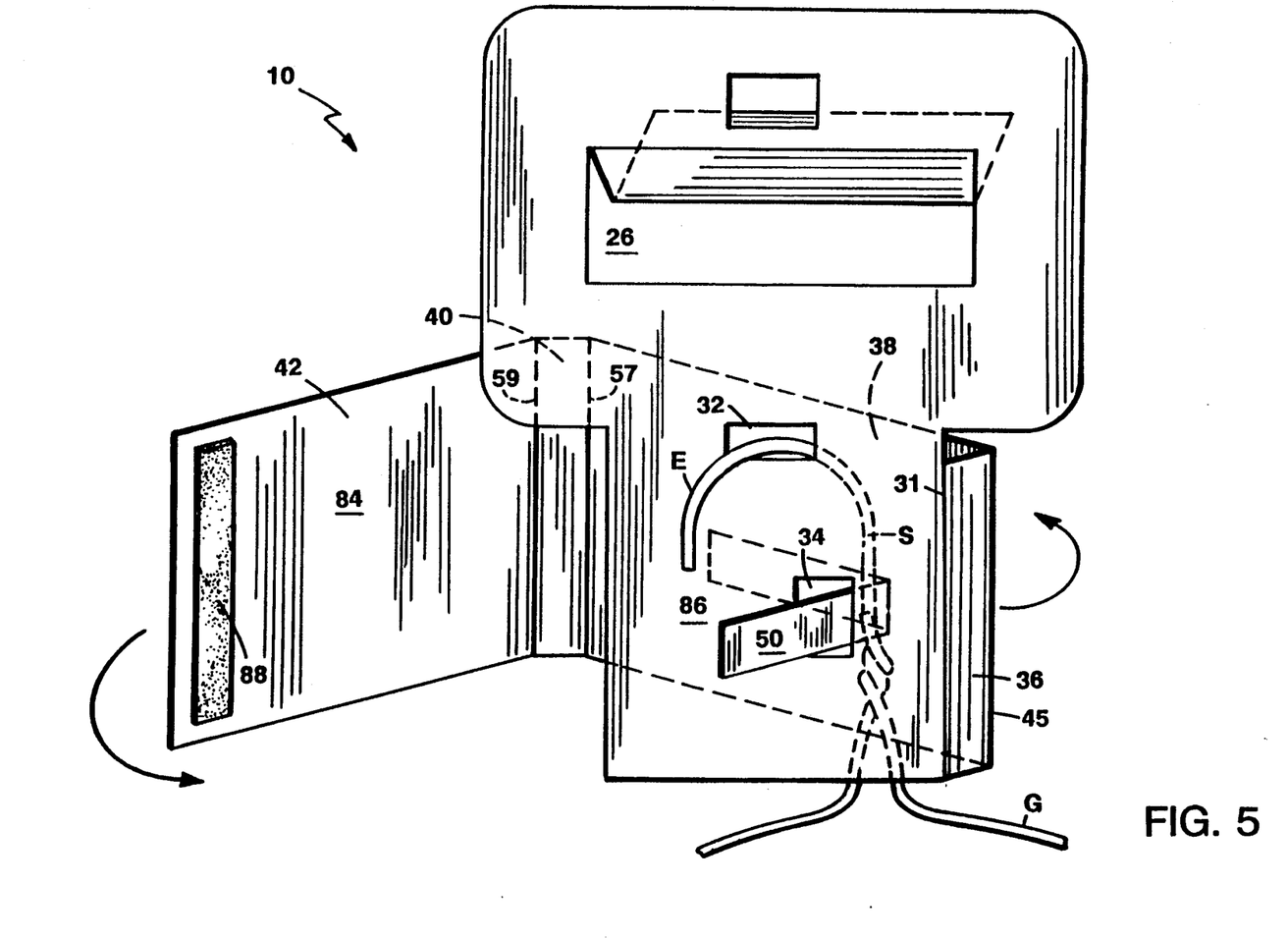
Figure 6:
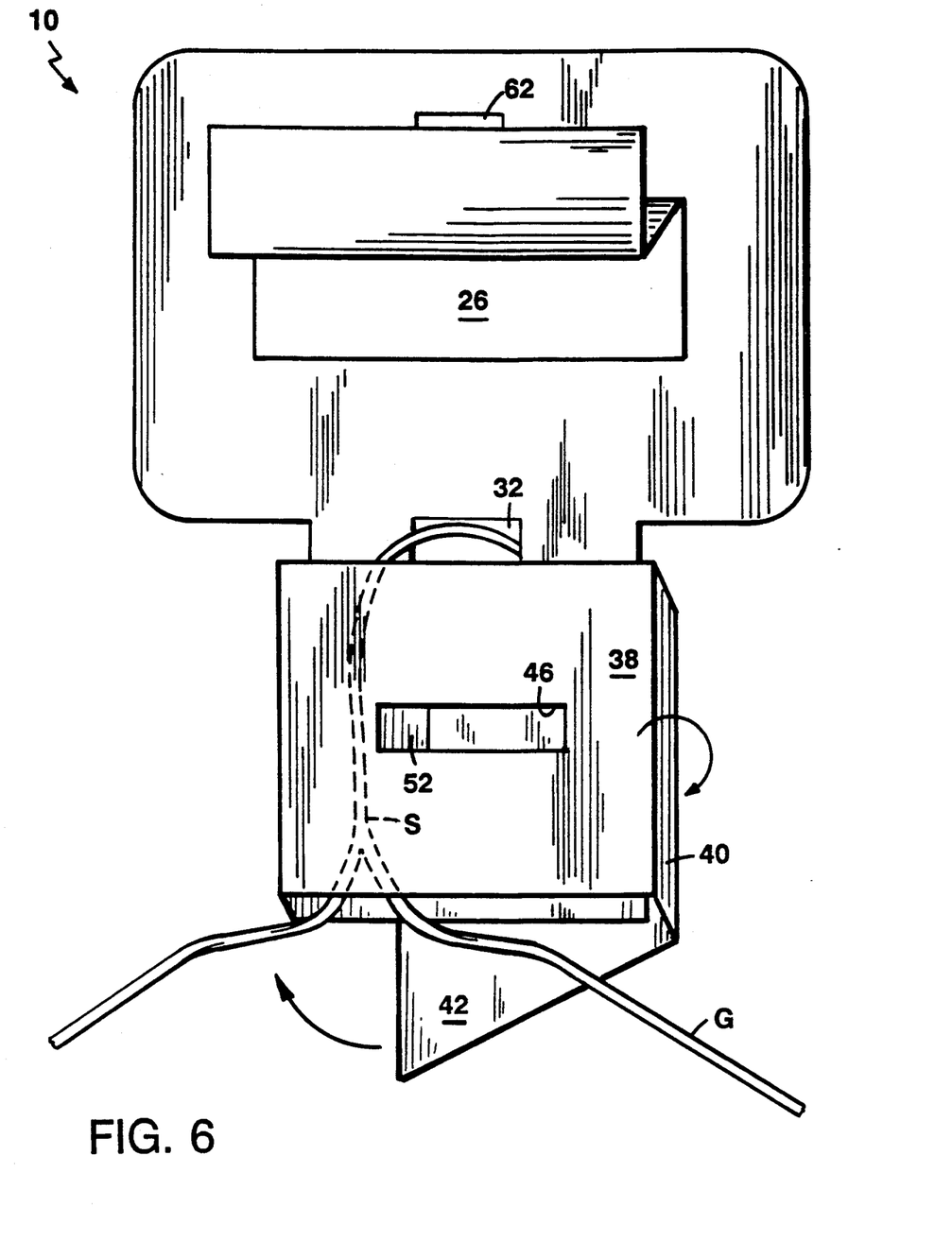

Referring now to FIG. 2, and also to FIGS. 4-6, the free end, E, of one or more garment hangers, G, is placed through the second orifice 32, with the shaft, S, of the hanger disposed in the region 76, generally between first vertical edge 30 and third orifice 34. The second flap 38 is moved from a first position (FIG. 2), with its inner face surface 78 spaced from face surfaces of the lower portion 28, toward a second position (FIGS. 5 and 6), with the inner face surface 78 disposed in opposition to, and generally in registration with, inner face surface 80 of the lower portion. As the second flap 38 is moved toward the second positioned the free end 54 of the securement tab 50 is positioned to extend through the third orifice 34, thus to further define garment hanger hook securement region 76 adjacent an inner face surface 82 of the first flap 36 generally opposed to the region between respective inner face surfaces 78, 80 of the second flap 38 and the lower portion 28.

Referring now to FIG. 6, the third flap 40 and the fourth flap 42 are folded at fold-lines 57, 59 about the lower portion 28 of the blank 20, the fourth flap 42 being moved from a first position (FIG. 2) with its inner face surface 84 spaced from face surfaces of the lower portion 28 and a second position (FIG. 6) with the inner face surface 84 disposed in opposition to an opposed outer face surface 86 (FIG. 3) of the lower portion 28 (the outer face surface 86 being opposite to the inner face surface 80 of the lower portion 28 disposed in opposition to, and generally in registration with, the inner face surface 78 of the second flap 38). The position of the surface 84 of the fourth flap 42 also serves to restrict the free end 54 of the securement tab 50, extending upon the surface 86, from dislodgement from the third orifice 34.

An adhesive strip 88 attached upon the inner face surface 84 of the fourth flap 42 (FIG. 2) is exposed, e.g. by removal of a cover sheet (not shown), and engaged between the opposed surfaces 84 86 to secure the flaps about the lower portion, and to restrict dislodgement of the free end of the securement tab 50.

The fourth orifice 62 is sized and constructed to permit the garment hanger 10 to be suspended from a hook such as a garment hook in an automobile.

Other embodiments are within the following claims. For example, the first and second flaps, and also the third and fourth flaps, may be integrally formed, with the thickness offset provided in the preferred embodiment of the garment carrier by the first and third flaps (as described above) being instead accommodated, e.g., by bowing of the second and fourth flaps.

What is claimed is:

1. A garment carrier formed of a thin piece of material, comprising
    a body having an upper portion defining a first orifice extending therethrough, said upper portion forming a handle, and a lower portion having a first vertical edge and defining a second orifice for receiving a free end of one or more garment hanger hooks therethrough and a third orifice,
    a first flap having a first vertical edge and a second vertical edge generally parallel thereto, said lower portion and said first flap joined in a hinged connection along respective first vertical edges,
    a second flap having a second vertical edge, said first flap and said second flap joined along respective second vertical edges,
    a securement tab having a first end connected to an inner face surface of said second flap and a second free end,
    said second flap adapted for movement from a first position with said inner face surface spaced from face surfaces of said lower portion and a second position with said inner face surface disposed in opposition to, and generally in registration with, an inner face surface of said lower portion,
    said securement tab, with said second flap in said second position, disposed to extend through said third orifice, thus to define a garment hanger hook securement region adjacent an inner face surface of said first flap opposed to a region between respective inner face surfaces of said lower portion and of said second flap,
    said garment carrier further comprising means for securing said second flap in said second position for transport and storage of garments.

2. The garment carrier of claim 1 wherein said first flap and said second flap are joined along respective second vertical edges in hinged connection.

3. The garment carrier of claim 1 wherein said second flap has a third vertical edge generally parallel to said second vertical edge, and said garment carrier further comprises
    a third flap having a third vertical edge and a fourth vertical edge generally parallel thereto, said second flap and said third flap joined in a hinged connection along respective third vertical edges, and
    a fourth flap having an inner face surface and a fourth vertical edge, said third flap and said fourth flap joined along respective fourth vertical edges,
    said fourth flap adapted for movement from a first position with its said inner face surface spaced from face surfaces of said lower portion and a second position with its said inner face surface disposed in opposition to an opposed outer face surface of said lower portion, said outer face surface being opposite to the inner face surface of said lower portion disposed in opposition to the inner face surface of said second flap, and
    said means for securing said second flap in said second position for transport and storage of garments comprises an adhesive member disposed between opposed surfaces of said lower portion and said fourth flap.

4. The garment carrier of claim 3 wherein said third flap and said fourth flap are joined along respective fourth vertical edges in hinged connection.

5. The garment carrier of claim 3 wherein, in said second position, the free end of said securement tab is disposed between the opposed surfaces of s id lower portion and said fourth flap.

6. The garment carrier of claim 3 or 5 wherein said inner face surface of said fourth flap is disposed generally in registration with the opposed face surface of said lower portion.

7. The garment carrier of claim 1 wherein said upper portion defines a fourth orifice sized and adapted for receiving an automobile garment hook therethrough for suspension of said garment carrier.

8. The garment carrier of claim 1 wherein said first, orifice has a first upper, generally horizontal edge and said garment carrier further comprises a fifth flap having a surface and a first horizontal edge, said upper portion and said fifth flap joined in a hinged connection along respective first horizontal edges, whereby said fifth flap defines a carrying surface for distributing load during transport of garments.

9. The garment carrier of claim 8 wherein said fifth flap has a second horizontal edge generally parallel to said first horizontal edge, and said garment carrier further comprises a sixth flap having a surface and a second horizontal edge, said fifth flap and said sixth flap joined in a hinged connection along respective second horizontal edges, whereby said fifth and sixth flaps together define said carrying surface for distributing the load during transport of garments.

10. The garment carrier of claim 8 or 9 wherein said carrying surface is formed by a surface of said upper portion, dislodged from said first orifice.

11. The garment carrier of claim 1 wherein said second flap defines a second flap orifice having a vertical securement edge, and said first end of said securement tab is attached to said second flap in hinged connection at said vertical securement edge.

12. The garment carrier of claim 11 wherein said securement tab is formed of material dislodged from said second flap orifice.

13. The garment carrier of claim 1 wherein said thin piece of material is formed of a biodegradable material.

14. The garment carrier of claim 13 wherein said material is corrugated cardboard.

15. The garment carrier of claim 1 or 13 wherein said material is plastic.

16. A blank of corrugated cardboard or the like for forming a garment carrier, comprising a body having an upper portion defining a first orifice extending therethrough, said first orifice having a first upper, generally horizontal edge, and a lower portion having a first vertical edge and defining a second orifice and a third orifice, a first flap having a first vertical edge and a second vertical edge generally parallel thereto, said lower portion and said first flap joined in a hinged connection along respective first vertical edges, a second flap having a second vertical edge, said first flap and said second flap joined along respective second vertical edges, and said second flap defining a second flap orifice having a vertical securement edge, and a securement tab formed by dislodgement of material from said second flap orifice, said securement tab having a first end attached to said second flap at said vertical securement edge and a second free edge, said blank further comprising a fifth flap having a surface and a first horizontal edge, said upper portion and said fifth flap joined in a hinged connection along respective first horizontal edges, and said fifth flap having a second horizontal edge generally parallel to said first horizontal edge, and a sixth flap having a surface and a second horizontal edge, a sixth flap having a surface and a second horizontal edge, said fifth flap and said sixth flap joined in a hinged connection along respective second horizontal edges.

17. The blank of claim 16 wherein said first flap and said second flap are joined along respective second vertical edges in hinged connection.

18. The blank of claim 16 wherein said second flap has a third vertical edge generally parallel to said second vertical edge, and said blank further comprises a third flap having a third vertical edge and a fourth vertical edge generally parallel thereto, said second flap and said third flap joined in a hinged connection along respective third vertical edges, and a fourth flap having an inner face surface and a fourth vertical edge, said third flap and said fourth flap joined along respective fourth vertical edges.

19. The blank of claim 18 wherein said third flap and said fourth flap are joined along respective fourth vertical edges in hinged connection.

20. The blank of claim 16 wherein said upper portion defines a fourth orifice.

21. The blank of claim 16 wherein said thin piece of material is formed of a biodegradable material.

* * * * *